United States Patent [19]

Cushing

[11] 3,855,858
[45] Dec. 24, 1974

[54] SELF SYNCHRONOUS NOISE REJECTION CIRCUIT FOR FLUID VELOCITY METER

[76] Inventor: Vincent J. Cushing, 9804 Hillridge Dr., Kensington, Md. 20795

[22] Filed: Aug. 1, 1973

[21] Appl. No.: 384,770

[52] U.S. Cl. .............................. 73/194 EM, 73/181
[51] Int. Cl. ........................... G01f 1/00, G01p 5/08
[58] Field of Search ........................ 73/194 EM, 181

[56] References Cited
UNITED STATES PATENTS
3,677,082    7/1972    Springston, Jr. et al. ............. 73/181

OTHER PUBLICATIONS

Denison, Jr. et al., Circulation Research, Vol. III, Jan. 1955, pp. 39–46.

*Primary Examiner*—Charles A. Ruehl
*Attorney, Agent, or Firm*—Pollock, Philpitt & Vande Sande

[57] ABSTRACT

A noise rejection circuit for use with electromagnetic fluid flow meters. An electromagnetic fluid flow meter with an electromagnet to induce a magnetic flux of periodically changing polarity. Sensors are positioned so as to receive the voltages induced therein by reason of flow of fluid cutting the flux lines. The low level signal of the sensors requires extremely efficient noise elimination circuits.

After eliminating noise in conventional manners, the oscillator which drives the electromagnet is synchronized to the noise. In one embodiment the signal voltages are periodically sampled through a switch controlled by the oscillator output. Since the oscillator is synchronized to the noise voltages, so is the sampling switch. Consequently, the noise signal appears as a DC level which is eliminated by passing the signals of interest through an AC coupled amplifier. In another embodiment the signals are fed through a phase sensitive demodulator to eliminate the noise components of the signal.

12 Claims, 3 Drawing Figures

SELF SYNCHRONOUS NOISE REJECTION CIRCUIT FOR FLUID VELOCITY METER

BACKGROUND OF THE INVENTION

The electromagnetic flow meter art is fairly well developed. Generation of a flow signal based on the principle of Farady induction is well understood. This instrument enjoys a wide range of usages in the process industries and over the years satisfactory techniques have been found to obtain adequate signal-to-noise ratios in the face of electrical noise. However, almost all of the electromagnetic flow meter art has been developed for pipeline usages in which the sensor monitors fluid flow passing through a closed conduit, usually the form of a conventional circular pipe. The sensing electrodes are therefore encased within the pipe which is generally metallic. As a result, the pipe supplies considerable shielding of any electrical noise. In recent years an effort has been made to employ the electromagnetic flow meter to the measurement of water velocity in rivers, streams, oceans, and other similar applications. The sensor configuration is one in which the monitored fluid flows around the exterior of the sensor. Many of the signal conditioning techniques employed in the pipeline configurations were tried in connection with the inside-out configuration utilized in measuring flow velocity in rivers, streams, and oceans. These standard conditioning techniques are useful but often times have been found to be inadequate in one important respect: the techniques have been unable to cope with the larger amounts of noise in the water velocity measurement configuration.

A typically commercially available electromagnetic flow meter in the pipeline configuration generates on the order of 500 microvolts per foot per second of flow velocity. The excellent shielding afforded by the pipeline configuration keeps the electrical noise levels low so that an excellent signal-to-noise ratio is obtained. To the contrary, however, the water current meter configuration makes it impractical to achieve sufficiently large magnetic fields in the water to produce anything like the flow generated voltages. Instead of 500 microvolts per foot per second, the water current meter configuration produces on the order of 10 microvolts per foot per second of velocity. The difficulty of maintaining adequate signal-to-noise ratios in the water current meter configuration is aggravated by the absence of the shielding afforded by the pipes in the pipeline configuration.

One type of water current flow meter is diagrammatically illustrated in FIG. 1. The sensor 20, which is illustrated in FIG. 1, includes an electromagnet 21 and a pair of electrodes 22. The electromagnet 21 provides a source of electromagnetic flux which is periodically reversed in polarity. The fluid flow moving through the magnetic flux generates a voltage in the electrodes 22 which are sensed, amplified, and produce an output voltage which is proportional to the velocity of flow.

A major difficulty found with devices of this sort is the fact that the signals induced in electrodes 22 have components other than a component proportional to the flow desired to be measured. This component is the noise component. Although these noise levels are very serious, they are also coherent. They are associated most often with the generation of electrical power, and therefore, the high ambient electrical noise is coherent with power frequency, generally 60 hertz in the U.S. but in some instance 50 hertz or even 25 hertz. This power frequency noise is not very often found to be a pure sine wave. Because of the almost limitless variety of non-linear loads, the electrical noise wave shapes encountered cannot be described simply. However, they are coherent and therefore can be considered in terms of a fundamental power frequency and harmonics thereof.

The low signal level makes it particularly difficult to employ conventional noise rejection techniques to eliminate the noise. For instance, the attenuation levels of passive filters are inadequate to reduce the level of power frequency noise to a level sufficient to provide a reasonable signal to noise ratio for the low signal levels encountered in the flow meters. For examples of the prior art see "Electronic Flow Meter System" by Kalmus appearing in the Review of Scientific Instruments, Volume 25, No. 3, for March 1954, pages 201–207, "Square-Wave Electromagnetic Flow Meter Design" by Denison and Spencer appearing in the Review of Scientific Instruments, Volume 27, No. 9 for September 1956 at pages 707–711 and "A Magnetic Flow Meter for Recording Cardiac Output" by Shirer, Shackelford and Jochin appearing in the Proceedings of the IRE for November 1959 at pages 1901–12.

SUMMARY OF THE INVENTION

The present invention provides a noise rejection circuit which is adequate to eliminate sufficient power frequency noise or noise adjacent the power frequency to provide a reasonable signal-to-noise ratio so that the signals of interest can be monitored without interference or masking by noise.

There are broadly two classes of electromagnetic flow meters in use in the prior art. One type employs a sinusoidal magnet drive to produce the electromagnetic flux. The second type of instrument employs a square wave magnet drive to produce the electromagnetic flux. The use of this latter type of instrument has been prompted by a desire for zero-point stability. See Shirer et al., proceedings of the IRE, Volume 47, page 1901 (1959) and Tucker et al, Jour. Inst. Nav., Volume 23, page 302 (1970). Applicant's noise rejection circuit techniques can be applied to either type of electromagnetic flow meter. The application of the invention to square wave driven flow meters will first be described and illustrated. Subsequently, its application to sinusoidally driven flow meters will be described.

For reasons unrelated to the noise problems, the electromagnet is driven by a voltage which periodically reverses in polarity. The voltage on the sensors is sampled at times when the electromagnetic flux produced by the electromagnet is unchanging. This is accomplished by driving a sampling switch (from the oscillator which drives the electromagnet) at times when the magnetic field is unchanging. The noise rejection circuit of applicant's invention senses the noise present at the electrodes 22 and synchronizes the oscillator with the noise frequency. As a result, the noise voltage seen at the sampling switch appears constant. It is then a simple matter to eliminate this constant noise level by AC coupling the signal to an AC amplifier. The output of the amplifier is then fed to the remainder of the signal processing circuits. The sampling switch is operated at a frequency exactly twice the frequency of the oscillator.

For the sinusoidally driven magnet, the sampling switch is eliminated and a phase sensitive demodulator is fed from the AC amplifier. In this case the flow meter can be operated at some sub-harmonic of the power frequency such as 30 hertz. The phase sensitive demodulator operating at 30 hertz then provides excellent noise rejection capabilities.

By synchronizing the sampling operation or the demodulation to the noise actually sensed at the electrodes 22, the noise rejection circuit disclosed herein enjoys a particular number of advantages. In many applications, the noise present is not due to power generated by a utility, but instead, is a result of power generated by captive power systems such as systems employed by industry. While it is well known that the power frequency generated by utilities is held within close tolerances, this is not generally true of privately generated power. As a result, the user of a flow meter cannot be assured that the noise will be exactly 60 hertz but it may vary above or below this value. Therefore, synchronizing the oscillator with the power frequency generated by a utility will not suffice. In fact, if the oscillator is synchronized to a frequency which is slightly different than the noise frequency actually present at the electrodes 22, the AC coupling will greatly magnify the effect of this noise and almost surely disable the equipment. Furthermore, there are many instances when utility power is not available to a user of a flow meter and it would be impossible for him therefore to synchronize his oscillator with that frequency.

By synchronizing the oscillator to the noise frequency actually sensed at the electrodes 22, the noise rejection circuit itself selects the noise which can be most damaging. For instance, it is not unusual to have a number of privately owned power generating systems which are adjacent one another and whose frequency may be slightly different from one another. The system of the present invention singles out the higher amplitude noise and rejects this while ignoring any other lower level noise. If, for some reasons, the noise frequency to which the system has been synchronized suddenly drops in amplitude, then it becomes necessary for the system to lock onto the other noise frequency and reject that signal. By providing the oscillator synchronizing signal from the noise actually sensed at the electrodes, this function is readily accomplished.

BRIEF DESCRIPTION OF THE DRAWINGS

An understanding of the present invention can be obtained by reading the specification in light of the drawings which disclose a preferred embodiment. In the drawings.

DETAILED DESCRIPTION OF THE PREFERRED EMBODIMENT

Figure 1:
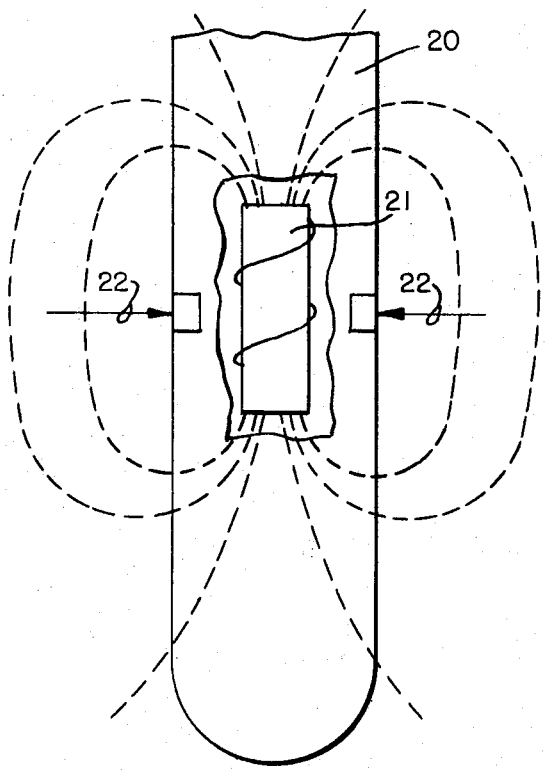
FIG. 1 is a diagrammatical representation of the electromagnet and electrodes which provide the signals to be processed.
Figure 2:
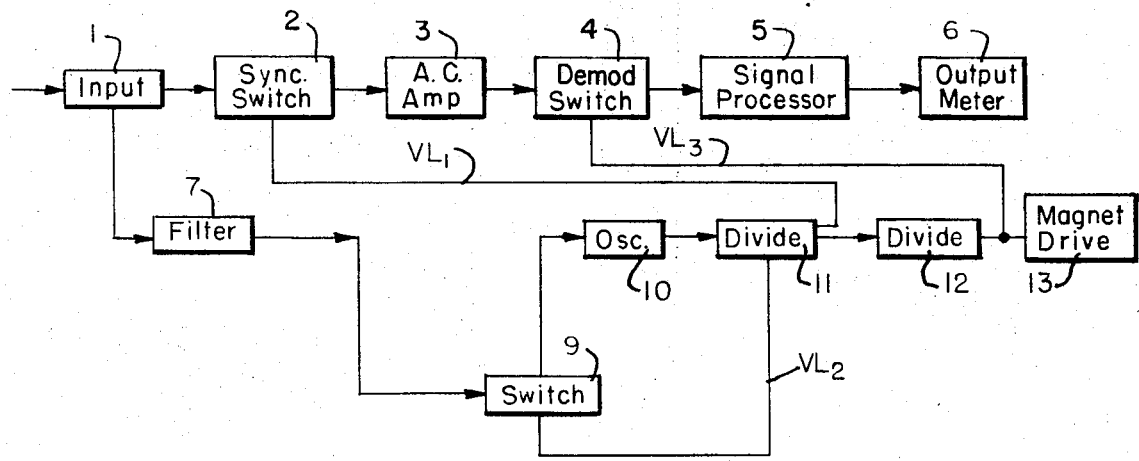
FIG. 2 is a block diagram of an entire system employing applicant's invention.

FIG. 2 shows an input circuit which is connected to the electrodes 22 in FIG. 1. The input circuit 1 is shown in more detail in FIG. 3 and suffice it to say here it merely provides an output to the synchronized sampling switch 2 and also to a filter 7. The synchronized sampling switch 2 is driven by a signal (VL1) derived from the oscillator 10 and at times provides a coupling path for the input signal to an AC amplifier 3. The output of the AC amplifier 3 provides a signal to a phase sensitive demodulator 4 which is synchronized again with a signal (VL3) derived from the oscillator 10. The output of this demodulator provides an input signal to the remainder of the signal processing circuits 5 which in turn provides a signal to the output meter 6. The signal processing circuit includes variable gain amplifiers to facilitate scale changing of the output signal for monitoring flow velocities of different levels.

The electromagnet 21 is driven by the magnet drive circuit 13. This generates a square wave signal to drive the electromagnet as has been discussed before. The manner in which this signal is generated will now be discussed.

The input 1 also provides an input to filter circuit 7 which is merely a band pass filter centered around 60 hertz. This filter eliminates unwanted signals so that the oscillator 10 can be synchronized with the noise signal. Although the band pass filter is centered around 60 hertz, its characteristics are such that closely adjacent frequencies will be passed as well. In particular, this provides for the passage of noise signals which may be induced by private power systems whose frequency may be slightly different from 60 hertz.

The output of the filter 7 is fed to the input of switch 9.

Oscillator 10 is a freerunning oscillator which is voltage controlled at its input. In a preferred embodiment of this invention, when noise frequency in the neighborhood of 60 hertz is expected, this oscillator is tuned to 480 hertz. the output of the freerunning oscillator 10 is provided to divide by 8 circuit 11. In other words, for every 8 input signals from oscillator 10 to divide by 8 circuit 11, the circuit will produce one output signal. One output (VL2) from the divide by 8 circuit 11 is fed to switch 9 as the control input. When this switch is closed by reason of the set state of VL2, the switch 9 will provide the noise signal to control the oscillator 10.

Another output (VL1) of the divide by 8 circuit 11 operates the synchronous sampling switch 2. Since the divide by 8 circuit 11 produces a signal at a 60 hertz repetition rate, the synchronous switch 2 will be closed at this rate. The same output of the divide by 8 circuit 11 which is provided to switch 9 also is provided to an input to divide by 2 circuit 12. The output of divide circuit 12 forms the time base for the magnet drive circuit 13 and also operates phase sensitive demodulator 4.

Since the oscillator 10 produces signals at a frequency of 480 cycles per second, the effect of divide by 16 provides a 30 hertz input to the magnet drive 13.

In operation, with the noise signal absent the signal passed by switch 9 will not affect the oscillator 10 and it will be free running at 480 hertz. The magnet drive time base is the 30 hertz signal fed to it by divide by 2 circuit 12. This produces electromagnetic flux which periodically changes in polarity at a 60 hertz rate. The voltage sensed at electrodes 22 is provided the input circuit 1. The voltage on these electrodes is sampled at a 60 hertz rate as established by the operation of the synchronous switch 2. This signal is AC coupled and amplified and eventually provided to the signal processing circuits.

Assuming now that the noise signal in the vicinity of 60 hertz rises and it will pass switch 9 and provide an input to oscillator 10. The periodic sampling of the noise signal will lock the oscillator 10 to the frequency and phase of the noise signal. As a result, the synchronous switch 2, the sampling switch, will close in synchronism with variations of the noise frequency. Therefore, the component of the signal presented to AC coupled amplifier 3 due to noise, will be essentially constant. The AC coupling of this amplifier will thus block this noise component. For a more detailed understanding of the manner in which the invention operates, reference is made to FIG. 3, which illustrates a schematic of portions of the circuitry shown in block diagram form in FIG. 2.

Figure 3:
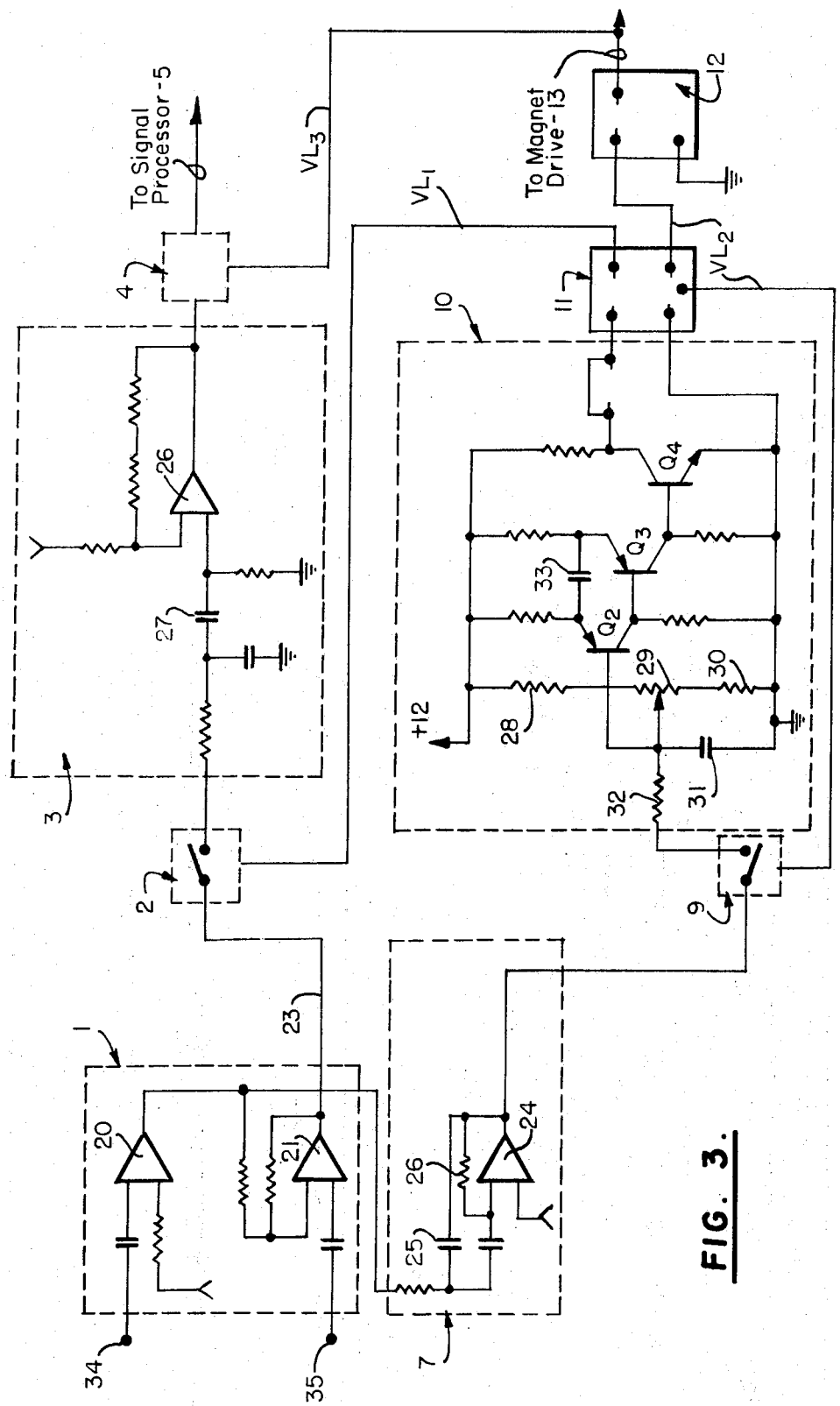
FIG. 3 is a detailed schematic showing of the noise rejection circuits and the circuits directly associated therewith.

FIG. 3 shows the input circuit 1 in greater detail. The input terminals 34 and 35 are respectively connected to one of the electrodes 22 shown in FIG. 1. The operational amplifiers 20 and 21 are connected in a differential amplifier configuration such that the output of amplifier 21, on conductor 23, is the difference between the input voltages sensed at electrodes 22. By this manner, commond mode signals are rejected. This is a noise rejection technique which is conventional in the art. Inasmuch as the filter is provided to lock onto the noise signal in the vicinity of 60 hertz, it would be inappropriate to utilize the signal on conductor 23 for these purposes. For this reason, the output of amplifier 20 is taken as the input to the band pass filter 7. The band pass filter comprises operational amlifier 24 and associated RC circuit. Of course, other conventional band pass configurations could be employed without departing from the spirit or scope of the present invention. What is important is that the band pass be centered around the expected noise frequency with sufficient latitudes so that noise frequencies on the order of 55 to 65 hertz will pass this filter. The output of the band pass filter is provided as an input to switch 9.

Switches 2 and 9 are each ¼ of a solid-state quad switch manufactured by RCA under the reference CD4016. This is merely a voltage operated switch which, when provided with sufficient voltage, will close.

Oscillator 10 comprises transistors Q2, Q3, and Q4 and the associated resistors and condensers as illustrated in FIG. 3. In normal operation the frequency of this oscillator is determined by the value of capacitor 33, and associated resistors and the setting of potentiometer 29. Basically oscillator 10 is a conventional relaxation oscillator whose frequency is determined by the charging times of capacitor 33.

The output of oscillator 10 is provided to divide by 8 circuit 11. This is a conventional RCA integrated circuit sold under the reference CD4022. One of the outputs (VL2) of divide by 8 circuit 11 is fed back and forms the control input to switch 9. Switch 9 periodically connects the filter output to the oscillator 10. The operation of periodically connecting the output of the filter to the oscillator results in the oscillator 10 locking onto the noise signal, in frequency and in phase.

The same output of divide by 8 circuit 11 is provided to divide by 2 circuit 12 which is also a conventional RCA integrated circuit sold under the reference CD4013. The output of divide by 2 circuit 12 provides the timing input to the magnet drive circuit 13 for properly timing the electromagnet and also the signal (VL3) to operate the phase sensitive demodulator 4.

A still further output (VL1) of divide by 8 circuit 11 operates the synchronous switch 2, which is the sampling switch coupling the output of amplifiers 20 and 21 to the AC coupled amplifier 3.

Before discussing the operation of the circuit and the generation of the logic voltages VL1, VL2, and VL3, it will be helpful to discuss the basic operating philosophy of this circuit.

The electrodes attached to the sensors, 34 and 35, are connected as an input to the differential amplifiers 20 and 21. The electromagnetic water current meter generates a differential voltage, but any electrical noises, especially the coherent power frequency noise, is for the most part common mode. Hence, the differential amplifier goes a long way in discriminating against the coherent electrical noises that may be in the metered water. (The flow meter disclosed herein is intended for use in metering of various forms of water, fresh water, waste water, sea water or other, but the invention can be applied to the metering of other fluids as well.)

The output of the differential amplifier is sampled by means of the synchronous switch 2 and its associated capacitor. This combination is generally referred to as a sample-and-hold element. This switch closes momentarily to sample a positive portion of the flow generated and then one half cycle later (relative to the magnet alternation), the switch closes again momentarily to sample the negative portion of the flow generated voltage. The sampling then is synchronous with the electromagnetic voltage and at twice the frequency. The synchronous switch is actuated by the logic voltage VL1. When a logic voltage VL1 is a logical 1, the switch closes and vice versa. While the switch is open, the holding capacitor simply holds the sampled voltage. A solid-state switch that is suitable for this purpose is RCA's CD4016.

Since this switch alternately holds samples of the positive and negative phases of the flow generated voltage, the voltage on the holding capacitor is substantially a square wave alternating voltage with an RMS value proportional to the velocity of the metered fluid. This alternating voltage is then amplified by AC amplifier 3 and provided as an input to the phase sensitive demodulator 4. The output of the phase sensitive demodulator 4 is a DC voltage proportional to the velocity of the metered fluid flow.

The phase sensitive demodulator 4 is well known in the art. Essentially this device multiplies its input voltage by a plus 1 when the control voltage VL3 is a logical 1, and multiplies its input voltage by minus 1 when the control voltage VL3 is a logical zero.

The ability of the synchronous switch to reject coherent electrical noise can be seen from the following. Let us assume that the magnet is alternating at 30 hertz so that the synchronous switch samples at a rate of 60 hertz. Any 60 hertz electrical noise that is not rejected by the differential amplifier will be sampled every 1/60th of a second. Therefore, the synchronous sampling switch will sample the 60 hertz noise voltage each time at the same electrical phase. In other words the synchronous sampling switch will sample the same voltage time after time and therefore the holding capacitor will hold a constant nonvarying noise voltage. Since the AC amplifier does not pass and amplify nonvarying voltages, the effects of the 60 hertz noise voltage is blocked. It should be readily apparent that the voltage on the holding capacitor will also be nonvarying if the synchronous switch operates at ½, ¼, ⅛ of the frequency of the coherent noise voltage. Since the synchronous switch must operate at a frequency precisely twice the drive frequency of the electromagnet, it is apparent that it is desirable to operate the electromagnet and the phase sensitive demodulator at any one of the even subharmonics of the noise voltage.

In order to maintain this synchronism, a phase locking circuit is employed (see Gardner, *Phase Lock Techniques*, published by John Wiley & Sons, 1966).

In order to sense the coherent noise voltage, the water current meter's electrodes can be used, although separate electrodes could of course be employed. The noise voltage is fed through amplifier 20 and then directed to band pass filter 7. Since the noise voltages encountered are coherent and we know the approximate frequency of the expected noise, the band pass filter has its centr frequency set at the expected frequency of the noise voltage. This will enable the circuit to reject extraneous signals. The output of the band pass filter is a substantially sinusoidal voltage proportional to the noise voltage. As an example, let us assume that the coherent noise voltage is at 60 hertz and the electromagnetic frequency is to be precisely half this or 30 hertz. The logic voltage VL3 will then be at 30 hertz since this is the voltage which serves as the time base for the electromagnetic drive. The logic voltage VL3 is produced by divide by 2 circuit 12 which can be RCA's CD4013A. The input to this divide by 2 circuit 12 is the square wave logic voltage VL2 produced by divide by 8 circuit 11. The input voltage to divide by 8 circuit 11 is the output of the oscillator 10. Oscillator 10, when freerunning, produces a 480 hertz square wave. The exact frequency of the oscillator under operation will be determined by the noise voltage which provides the control input to this oscillator.

Without any noise voltage or with a 60 hertz noise voltage, the oscillator 10 produces a 480 hertz square wave. VL1, produced by divide by 8 circuit 11, is the pulse train having a repetition rate of 1/60th of a second and with a pulse duration of 1/480 of a second. The logic voltage VL2, also produced by the divide by 8 circuit 11, is a 60 hertz square wave, that is, it has a repetition rate of 60 hertz and a pulse duration of 1/120th of a second. VL2 provides the input signal to divide by 2 circuit 12 such that the output of divide by 2 circuit 12, VL3, is a 30 hertz square wave.

It may be desirable to operate the electromagnet at an even lower frequency than 30 hertz, such as 15 hertz. In this instance, the oscillator 10 can be adjusted to be free running at approximately 240 hertz so that the logic voltages VL1 and VL2 would have repetition rates of 30 hertz and VL3, providing the time base for the electromagnet, would have a frequency of 15 hertz. In this arrangement, VL1, rather than VL2, would operate the switch 9, which would pass less than 1/2 cycle of the 60 hertz noise voltage in order to actuate the oscillator 10 to phase lock the system.

In operation, the noise signal level is periodically passed by switch 9 to lock frequency and phase of oscillator 10 onto the frequency and phase of the noise signal.

As a direct result of synchronization of oscillator 10 with the noise signal, synchronous sampling switch 2 also becomes synchronized with the noise signal. Therefore, the synchronous switch 2 will close periodically, at times when the noise signal is of approximately equal amplitude. As a result, the noise signal component will appear, to AC coupled amplifier 3, as a DC level. Capacitor 27, which provides the AC coupling, will therefore block the component of the noise signal from the remainder of the signal processing circuits.

As is well understood in the art, it is desirable that the sampling switch, or synchronous switch 2, be open at times when the electromagnetic flux produced by the electromagnet is changing in polarity. Therefore, the output of divide by 8 circuit 11 which operates the synchronous switch 2 is so chosen so that synchronous switch 2 is closed after the electromagnetic flux has been reversed in polarity.

It was mentioned above the applicant's invention could also be utilized with a sinusoidal electromagnetic drive. The circuit of FIG. 3 can, very simply, be modified in the following manner.

The logic voltage VL3 is a square wave which can be employed to drive a conventional sinusoidal alternating electrical magnet. This square wave voltage is passed through a narrow band pass filter tuned to 30 hertz (or other desired frequency of operation). This filter essentially passes the fundamental 30 hertz sinusoid, and rejects all of the higher harmonics making up the square wave of VL3. The output of the narrow band pass filter is provided to a potentiometer. The tap of this potentiometer allows the sinusoidal voltage produced by the band pass filter to be set at a convenient level. This tapped off voltage is provided as a positive input voltage to an operational amplifier. The output of the operational amplifier is provided as the input signal to the bases of a pair of bi-polar transistors connected between positive and negative sources of potential. The output of the transistors, taken at their common emitters, is provided to the magnet coil itself. Connected in series with the magnet coil is a sampling resistor. The voltage across the sampling resistor is provided as a negative input to the operational amplifier. With this arrangement, the current through the electromagnetic coil faithfully follows the magnitude and wave shape of the voltage found at the output of the band pass filter. The only other modification necessary to the circuitry of FIG. 3 is to eliminate the synchronous switch 2 and its associated holding capacitor and directly connect the output of the differential amplifier combination 20 and 21 to the AC amplifier 3. With this arrangement the conventional sinusoidal electromagnetic drive employs the phase demodulator which is phase locked to the noise voltage sensed by the current meter's electrodes.

As a result of synchronizing the sampling switch in the signal processing circuit, with the noise frequency which is actually sensed at the electrodes, the user is assured that the most troublesome noise will be eliminated. The self-synchronous operation of the noise rejection circuit will follow the noise frequency, if it varies, in order to ensure proper noise rejection. In the event of a plurality of noise signals, the one of higher magnitude will be rejected. In addition, by synchronizing the oscillator to the noise signal actually received at the electrodes, it is possible to provide synchronous noise rejection in cases where there is no access to a signal at the power frequency in the area.

What I claim is:

1. An electromagnetic flow meter comprising an oscillator driving an electromagnet to produce electromagnetic flux periodically reversing in polarity, elecrodes in which a signal is induced related to fluid flow and an amplifier to amplify said signal induced in said electrodes, the improvement comprising a self-synchronous niose rejection circuit including,
 (a) circuit means to sense coherent noise signals in the metered fluid,
 (b) second circuit means to phase lock said oscillator to said coherent noise, and
 (c) means connected to said amplifier to detect, synchronously with said oscillator, said signal,
 (d) whereby said coherent noise is substantially rejected.

2. The apparatus of claim 1 wherein said means connected to said amplifier includes a sampling switch connected between said electrodes and said amplifier,
 said sampling switch being operated synchronously with said oscillator.

3. The apparatus of claim 2 wherein dividing circuit means is connected between said oscillator and said sampling switch.

4. The apparatus of claim 1 wherein dividing circuit means is connected to said oscillator output and periodically connects said second circuit means to said oscillator.

5. The apparatus of claim 1 wherein said means connected to said amplifier includes phase sensitive demodulator means.

6. The apparatus of claim 5 wherein dividing circuit means, connected to said oscillator output, is connected to and controls said phase sensitive demodulator.

7. The apparatus of claim 1 where said electromagnet operates at a frequency which is chosen as an even subharmonic frequency of expected coherent noise.

8. The apparatus of claim 7 wherein said means connected to said amplifier includes a sampling switch connected between said electrodes and said amplifier,
 said sampling switch being operated synchronously with said oscillator.

9. The apparatus of claim 8 wherein dividing circuit means is connected between said oscillator and said sampling switch.

10. The apparatus of claim 7 wherein dividing circuit means is connected to said oscillator output and periodically connects said second circuit means to said oscillator.

11. The apparatus of claim 7 wherein said means connected to said amplifier includes phase sensitive demodulator means.

12. The apparatus of claim 11 wherein dividing circuit means, connected to said oscillator output, is connected to and controls said phase sensitive demodulator.

* * * * *